(12) United States Patent
Hong et al.

(10) Patent No.: US 9,208,304 B2
(45) Date of Patent: Dec. 8, 2015

(54) METHOD FOR WEB SERVICE USER AUTHENTICATION

(71) Applicant: AJOU UNIVERSITY INDUSTRY-ACADEMIC COOPERATION FOUNDATION, Suwon (KR)

(72) Inventors: Man Pyo Hong, Seongnam (KR); Jong Uk Kim, Suwon (KR); Suk In Kang, Suwon (KR)

(73) Assignee: AJOU UNIVERSITY INDUSTRY-ACADEMIC COOPERATION FOUNDATION, Suwon (KR)

( * ) Notice: Subject to any disclaimer, the term of this patent is extended or adjusted under 35 U.S.C. 154(b) by 0 days.

(21) Appl. No.: 14/402,572

(22) PCT Filed: May 23, 2013

(86) PCT No.: PCT/KR2013/004503
§ 371 (c)(1),
(2) Date: Nov. 20, 2014

(87) PCT Pub. No.: WO2013/176491
PCT Pub. Date: Nov. 28, 2013

(65) Prior Publication Data
US 2015/0220718 A1 Aug. 6, 2015

(30) Foreign Application Priority Data
May 24, 2012 (KR) .................. 10-2012-0055413

(51) Int. Cl.
G06F 21/34 (2013.01)
H04L 29/06 (2006.01)

(52) U.S. Cl.
CPC ............... *G06F 21/34* (2013.01); *H04L 63/08* (2013.01); *H04L 63/083* (2013.01); *H04L 63/0807* (2013.01); *H04L 63/18* (2013.01)

(58) Field of Classification Search
CPC ..... G06F 21/34; H04L 63/08; H04L 63/0807; H04L 63/083; H04L 63/18
See application file for complete search history.

(56) References Cited

U.S. PATENT DOCUMENTS 7,379,921 B1 * 5/2008 Kiliccote ............. G06Q 20/401
705/75
8,627,438 B1 * 1/2014 Bhimanaik ......... H04L 63/0853
726/9

(Continued)

FOREIGN PATENT DOCUMENTS

| JP | 2007-193762 A | 8/2007 |
| KR | 10-2011-0006734 A | 1/2001 |
| KR | 10-2005-0100772 A | 10/2005 |

OTHER PUBLICATIONS

Jorissen et al., CredEx: User-Centric Credential Management for Grid and Web Services, Jul. 2005, IEEE International Conference on Web Services, vol. 1, pp. 149-156.*

(Continued)

*Primary Examiner* — Kenneth Chang

(57) ABSTRACT

Disclosed is a method for web service user authentication capable of increasing convenience while providing high security strength. The present invention has been made in an effort to provide a technique for conveniently performing user authentication by alleviating a user inconvenience of a memory of a password, storing a user password in a device which is carried by him/her at all times so as to use a powerful password, and using the password.

9 Claims, 4 Drawing Sheets

(56) References Cited

U.S. PATENT DOCUMENTS

| | | | | |
|---|---|---|---|---|
| 2009/0117883 A1* | 5/2009 | Coffing | ............... | H04L 12/5895 455/414.1 |
| 2009/0293112 A1* | 11/2009 | Moore | ................. | G06Q 20/042 726/9 |
| 2011/0026716 A1* | 2/2011 | Tang | ...................... | G06F 21/43 380/284 |
| 2012/0138679 A1* | 6/2012 | Doyle | .............. | G06K 19/06037 235/380 |
| 2013/0173915 A1* | 7/2013 | Haulund | ............... | H04L 9/3226 713/159 |
| 2013/0205380 A1* | 8/2013 | Avni | ................... | H04L 63/0853 726/7 |

OTHER PUBLICATIONS

International Search Report for PCT/KR2013/004503 filed May 23, 2013.

* cited by examiner

METHOD FOR WEB SERVICE USER AUTHENTICATION

TECHNICAL FIELD

The present invention relates to a method for web service user authentication capable of increasing convenience while providing high security strength.

BACKGROUND ART

Today, most web services have used an ID/password scheme to identify and authenticate accessing users. In the case of requiring a high level of security such as Internet banking, user authentication may be made using a certificate which is specifically stored on a hard disk or a USB disk, but a scheme for performing user authentication by allowing a user to directly input a password through a keyboard relying on his/her memory has been mainly used.

Since the ID/password scheme may be easily implemented by service providers and may make it difficult for other persons to find out a user password until the user password stored somewhere is exposed or the user directly gives other persons his/her password, the ID/password scheme has been recognized as a convenient, safe authentication scheme. Further, most devices such as a personal computer and a smart phone which may access a web page include a keyboard, and therefore users may input alphabetical characters and figures without any difficulty to very conveniently use these devices. Thanks to the advantages, nearly all web services have currently performed the user authentication using the ID/password scheme.

However, a threat of brute force attack is increased with the development of computer performance and a dictionary (a set of words which are highly likely to be used as a password) accumulated by hackers is increasingly elaborate as time goes by, and as a result, attackers may find out passwords which are simple or frequently used within a short period of time. Therefore, service providers adopting the ID/password scheme are trying to prohibit users from setting too simple passwords and recommend matters to be observed to users or force users to observe the recommended matters. The main matters are as follows.

① Combine alphabetical characters with figures. In some cases, include special characters (characters, such as !, @ and #, other than alphabetical characters and FIGS.

② Make a length of a password long

③ Periodically change a password

Forcing users to combine alphabetical characters and figures is to prohibit users from using general words as a password. A password needs to satisfy a conflicting condition that a combination of words or figures may be hardly found out by other persons but may be always easily memorized by users. Therefore, users need to generate a plurality of combinations of words or figures which may be easily memorized by them so as to create a password. However, when creating a password using an English sentence combination, users frequently select a single English word. According to old research results, a password which is the most frequently used around the world is 'password'. Although not significantly changed toady, a password which is the most frequently used is 'password1'. A figure also is the same as the English sentence combination. When using only the figure, users often set their own birthday or anniversary using a password, and therefore other persons are highly likely to estimate the password. The above problems may be solved to some extent by combining alphabetical characters with figures.

The length of a password is to cope with the brute force attack. Through inputting all the figures from 0000 to 9999, a four digit PIN may be exposed someday. When combining alphabetical characters with figures and classifying capital and small letters, 62 candidates per one letter are generated. As a result, this scheme has better security than the PIN using only the figure but when a length is too short, is still vulnerable to the brute force attack. More than six letters have been generally used in the past, but the number of letters is inclined to be gradually increased. Today, services requiring a password formed of more than 8 digits have also been increased.

There are services that demand a password to be periodically changed. In this case, it is normal to demand a change of a password every three months or six months. However, an operation to create a safe, new password for security is a significant burden on users. To meet the policy, most users generally use two or three passwords by turns, and therefore it is difficult to obtain a desired effect.

For this reason, current web services force users to set a password formed of a considerably difficult combination. Usability which is the largest merit of the ID/password scheme is reduced as much. As the length of ID is long, the user has difficulty in typing and does not perform visual feedback to prevent peeking. Generally, a user may not know what characters he/she inputs due to the use of characters such as * or ●, and therefore may not conveniently perform the input.

An operation to create and memorize passwords with a difficult combination is fairly inconvenient for users, and thus the users may often use the same password on other web sites. Therefore, when one service exposes a password due to carelessness of server management, an attacker may easily login in other services in the user name using obtained information.

Users often directly input a password through a keyboard, and as a result an arising threat may also be present. Attackers secretly install a malignant code in users' devices to intercept and peek a keyboard input. Even though users create a password satisfying a high level of security, accurately memorize the created password, and accurately input the password without the visual feedback, when the password is exposed during an authentication process, all users' efforts which are performed before become invalidated.

That is, since the ID/password scheme has excellent convenience, users have no complaints about the ID/password scheme and since the service providers may easily implement the ID/password scheme, the ID/password scheme has been widely used. However, security requirements are continuously reinforced to cope with security accidents which frequently occur recently and therefore service providers request more powerful passwords of users. However, a memory of a user has a limitation, and therefore the password does not satisfy the security requirements.

SUMMARY OF THE INVENTION

The present invention has been made in an effort to provide a technique for conveniently performing user authentication by alleviating a user inconvenience of a memory of a password, storing a user password in a device which is carried by him/her at all times so as to use a powerful password, and using the password.

However, an object of the present invention is not limited to the foregoing matters and other objects of the present invention which are not mentioned may be clearly understood to those skilled in the art from the following description.

An exemplary embodiment of the present invention provides a method for web service user authentication including:

displaying, by a web server of the web service, a code including an authentication server uniform resource locator (URL) of the web service on a web browser screen; when a user photographs the code on the web browser screen using an authentication device, confirming, by the authentication device, the authentication server URL of the web service included in the code to confirm whether user confidential is stored; if it is determined that the user confidential is stored, generating, by the authentication device, an authentication token included the encoded confidential and transmitting the authentication token to the authentication server URL of the web service included in the code; and confirming, by the authentication server of the web service, a result obtained by decoding the received authentication token and if it is determined that a message is normal and a normal user attempts a login, informing the web server of the web service that the normal authentication is made.

The method may further include: prior to the displaying of the QR code including the authentication server URL of the web service on the web browser screen by the web server of the web service, providing, by the web server, a joining form to a user; transmitting, by the web server, a bit string for confirming an authentication device to an authentication device of a user when the user prepares a form; creating, by the web server, a code including a public key of the web service and displaying the created code on the web browser screen; creating, by the user, a user ID and a key pair if it is confirmed that the user does not join the web service using information received from the code including a public key of the web service, the key pair including a public key and a secret key; transmitting, by the authentication device, a message obtained by encoding a user ID, a public key of the key pair, a bit string, a public key of the web service, a signature for the bit string, and a signature for the public key of the web service using the public key of the web service to the web server; resolving, by the web server, the message received from the authentication device using his/her own secret key and confirming whether the signature is right; and storing, by the web server, contents of a form input by the user and a public key of the user obtained by decoding in its own database.

Another exemplary embodiment of the present invention provides a method for web service user authentication, including: providing, by a web server of the web service, a joining form to a user and transmitting a bit string for confirming an authentication device to an authentication device of the user when the user prepares the form; creating, by the web server, a code including a public key of the web service and displaying the created code on the web browser screen; creating, by the user, a user ID and a key pair if it is confirmed that the user does not join the web service using information of the code, the key pair including a public key and a secret key; transmitting, by the authentication device, a message obtained by encoding a user ID, a public key of the key pair, a bit string, a public key of the web service, a signature for the bit string, and a signature for the public key of the web service using the public key of the web service to the web server; resolving, by the web server, the message received from the authentication device using his/her own secret key and confirming whether the signature is right and storing contents of a form input by the user and a public key of the user obtained by decoding in its own database; displaying, by the web server, a code including an authentication server URL of the web service on a web browser screen; when the user photographs the code including the authentication server URL of the web service using an authentication device, confirming, by the authentication device, the authentication server URL of the web service included in the code including the authentication server URL of the web service to confirm whether confidential is stored; if it is determined that the confidential is stored, generating, by the authentication device, an authentication token in which confidential is encoded and transmitting the authentication token to the authentication server URL of the web service included in the code; and confirming, by the authentication server, a result obtained by decoding the received authentication token and if it is confirmed that a message is normal and a normal user attempts a login, informing the web server that the normal authentication is made.

As described above, according to the exemplary embodiments of the present invention, it is possible to perform the user authentication by recognizing the two-dimensional barcode of the screen using the camera when the dedicated device is present and improve the user convenience by driving applications which may be authenticated and then performing only the photographing even in the case of using the smart phone. In the case of a handicapped person who is difficult to perform the input through the keyboard, convenience may be more increased.

According to the exemplary embodiments of the present invention, it is possible to effectively cope with the brute force attack or the premeditated attack by using an encryption key instead of using the password. The existing 8 to 12 digit password which is combined only by alphabet and figures requires the attack attempts a maximum of $62^8$ ($\approx 2^{47}$) to $62^{12}$ ($\approx 2^{71}$) times, but according to the exemplary embodiment of the present invention, the encryption key usually uses 512 bits, 1024 bits, and 2048 bits, and therefore at the time of the brute force attack search, the attack attempts are required a maximum of $2^{512}$, $2^{1024}$, and $2^{2048}$ times, such that the present invention may provide the high security strength.

According to the exemplary embodiments of the present invention, the secret key essential for authentication is not stored in the authentication server, and therefore even though the specific web service is hacked to expose all the contents of database included in the authentication server, it is possible to prevent the login from being made in the user name.

According to the exemplary embodiments of the present invention, different confidential for each web service is used, and therefore even though the specific web service is exposed to hacking, no account of other services is damaged, each web service uses different keys at all times and thus user account may be secured, and the user does not require to memorize even his/her own ID and thus the user ID may be differently set for each web service, such that even though several web services maliciously gain agreement, it is difficult to find out a correlation between users.

According to the exemplary embodiments of the present invention, the user never directly inputs contents at the time of a login, and therefore the user account are safe from a keylogger (keyboard hacking).

According to the exemplary embodiments of the present invention, since all the security related information is stored in the smart phone of the user and the smart phone directly communicates with the web server, even when the stability of the used PC is not secured (for example, shared computer of a PC room, and the like), security may be secured.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
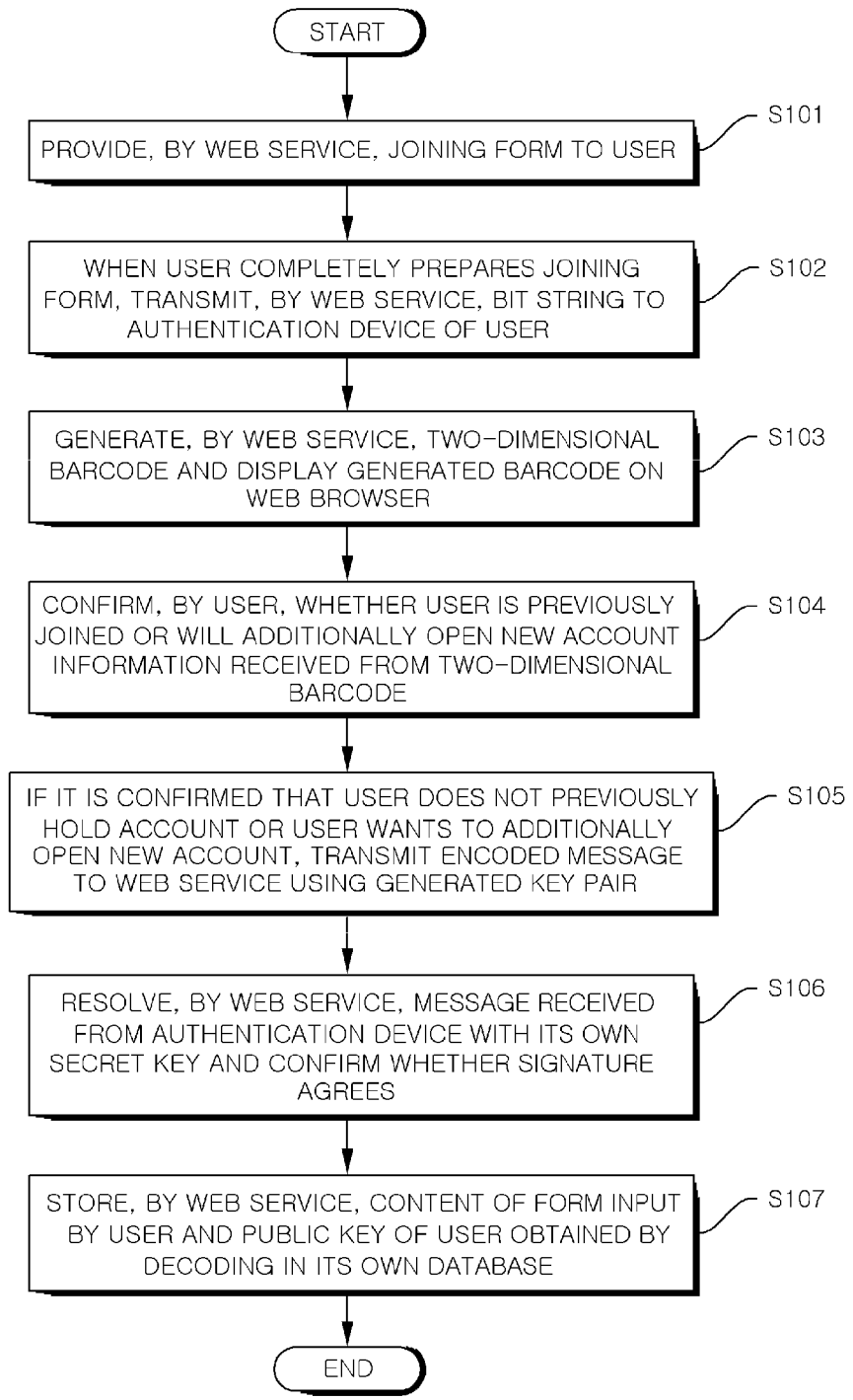
FIG. 1 is a diagram sequentially illustrating a procedure of creating an account when a user wants to join a web site, in a method for web service user authentication according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. It is to be noted that in giving reference numerals to components of each of the accompanying drawing, like reference numerals refer to like elements even though the like components are shown in different drawings. Further, in describing exemplary embodiments of the present invention, well-known functions or constructions will not be described in detail since they may unnecessarily obscure the understanding of the present invention. Further, exemplary embodiments of the present invention are described below, but may be variously modified and practiced by those skilled in the art without departing from the technical spirit of the present invention.

According to an exemplary embodiment of the present invention, in order for a user to login in a web service, the user stores all the used IDs and passwords in a device (for example, mobile phone) which is always carried by him/her and the corresponding device performs an authentication process, such that the user does not require to memorize his/her ID and password.

Conditions required by the device storing the ID and password are as follows.

① The device should have a camera.

② The device should have computing capability. (the device should be able to perform an encoding operation).

③ The device should be able to be accessed through the Internet.

④ The device should be always carried by a user.

A representative device satisfying all the conditions described above is a smart phone. A level of the camera is enough to analyze a two-dimensional barcode (or, two-dimensional code) such as QR code. In the computing capability, an encoding and decoding operation should be able to be performed. An encoding technology used herein needs to use a public key scheme, and therefore the computing capability enough to perform RSA or DSA within a short period of time is required and the Internet access should be able to be made. According to the scheme proposed by the present invention, since an authentication device may directly access an authentication server of a web site, when the authentication device may not be connected to the Internet, user authentication may not be made.

For the user authentication of a web service, a user needs to create his/her own account in a service and after the account is created, the user authentication is made through a login procedure and the user may receive a personalized service. An account creation method and a login method will be sequentially described below.

At the time of creating account

Figure 2:
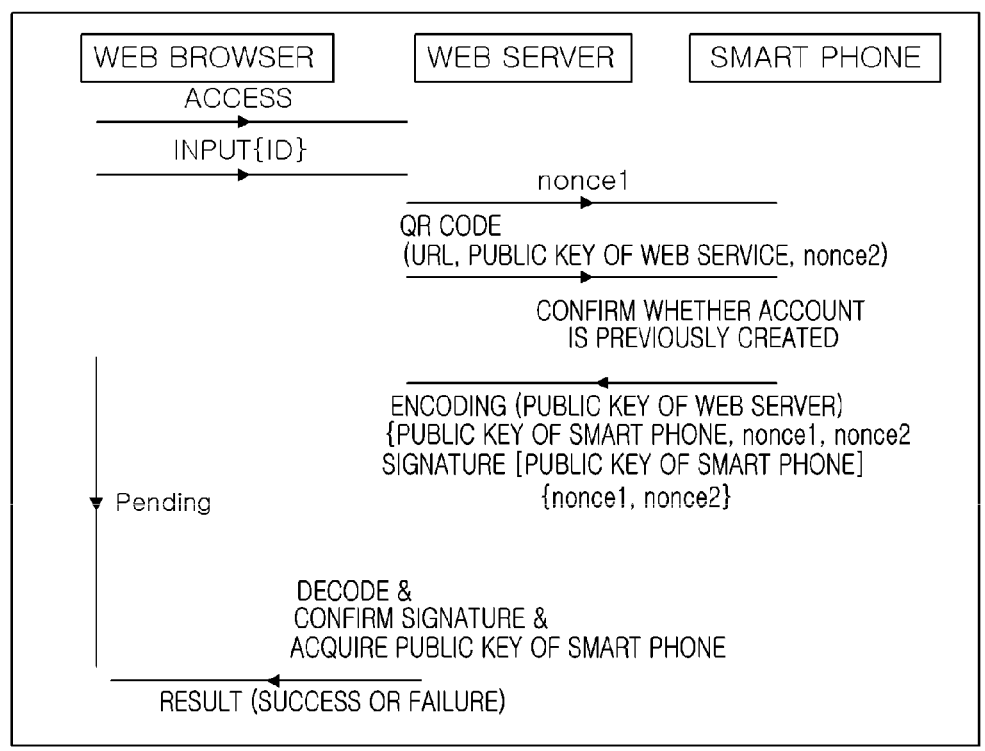
FIG. 2 is a diagram illustrating a message exchange procedure between a user and a web service at the time of creating an account based on the procedure as illustrated in FIG. 1.

FIG. 1 is a diagram sequentially illustrating a procedure of creating an account when a user wants to join a web site and FIG. 2 is a diagram illustrating a message exchange procedure between a user and a web service at the time of creating an account.

The account creation method will be described in detail below with reference to FIGS. 1 and 2.

First, when a user wants to join any web service, a web service provides a joining form to a user (S101).

Next, when the user prepares all forms in addition to his/her own ID, the web service needs to confirm an authentication device carried by the user so that the user may perform a login through the authentication device later. That is, an operation to bind the user with the authentication device is required. Therefore, the web service transmits a bit string to the user to confirm the authentication device. A method for transmitting a bit string may be diverse, but in the case of a smart phone, it is most convenient to use SMS. When the SMS may not be used (for example, in the case of using a device such iPod touch), any bit string is transmitted to a user through e-mail, and the like. In describing below the exemplary embodiment of the present invention, the bit string is marked by nonce1 (S102).

Next, the web service creates the two-dimensional barcode and shows the created barcode through a web browser. Any two-dimensional barcode may be used, but the QR code is most generally used. The tow-dimensional barcode includes a URL of the web service, a public key of the web service, and any new bit string different from the nonce1. In describing below the exemplary embodiment of the present invention, the bit string is marked by nonce2. As the public key of the web service, any public key algorithm within a range included in a gist of the present invention may be used. In describing below the present invention, the public key of the web service is marked by Wpub (S103).

Next, the user uses information received from the two-dimensional barcode to confirm whether he/she joins the corresponding web site in advance (that is, whether an account is created). One user may be permitted to have a plurality of accounts depending on characteristics of the web service. In this case, it is preferable to go through a process of confirming whether a new account is additionally opened (S104).

Next, if it is confirmed that the user joins the corresponding web site in advance or wants to additionally open a new account, a warning message is shown to the user and an account creation process stops.

On the other hand, if it is confirmed that the user does not previously hold an account or wants to additionally open a new account, the account creation process continuously proceeds. New confidential is configured of an ID and a public key of a newly created key pair (a public key and a secret key). Hereinafter, in describing the present invention, the public key and the secret key are marked by Dpub and Dpriv. Of the created key pair, the public key may be reckoned to replace a password. A user ID may be transmitted to the authentication device while being included in the QR code or the user may directly input the user ID to the authentication device. A scheme for transmitting a user ID to an authentication device while being included in the QR code may be convenient but may expose the user ID and a scheme for directly inputting a user ID may lower the exposure possibility of the user ID but may make the user inconvenient. When the key pair creation is completed, the authentication device encodes the user ID, the newly created public keys Dpub, nonce1, and nonce2, and a signature for the nonce1 and nonce2 based on the public key Wpub of the web service which is received beforehand. At the time of performing the signature, the newly created secret key Dpriv is utilized. The encoded message is transmitted to the web service. At the time of transmitting the encoded message, URL received through the QR code is utilized (S105).

Next, the web service resolves the message received from the authentication device of the user using his/her own secret key Wpriv and confirms whether the signature is right. The user has two accesses to the web service, in which one is an access using a computer at an early stage and the other is an access transmitting the encoded confidential using the authentication device. The web service should be able to find out whether the two accesses come from the same user. For this purpose, the nonce2 is used. Since the authentication device copies and takes the nonce2 using a camera, the computer and the authentication device share the same nonce2 value (S106).

Next, the web service stores contents input by the user and the user public key Dpub obtained by decoding in its own database to complete the account creation operation (S107).

At the time of login

Figure 3:
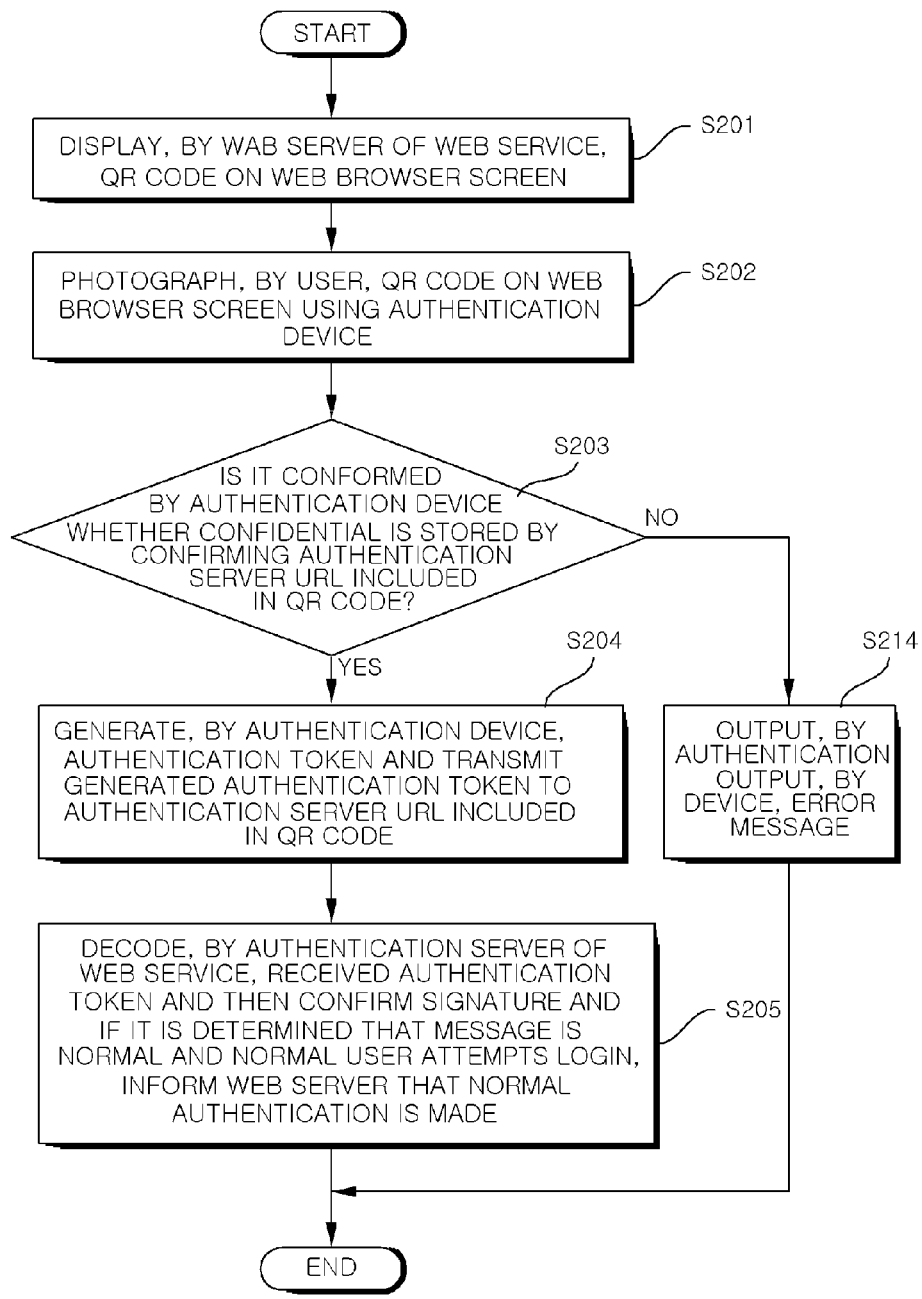
FIGS. 3 and 4 are diagrams illustrating a login procedure using a pre-stored account, in the method for web service user authentication according to an exemplary embodiment of the present invention.
Figure 4:
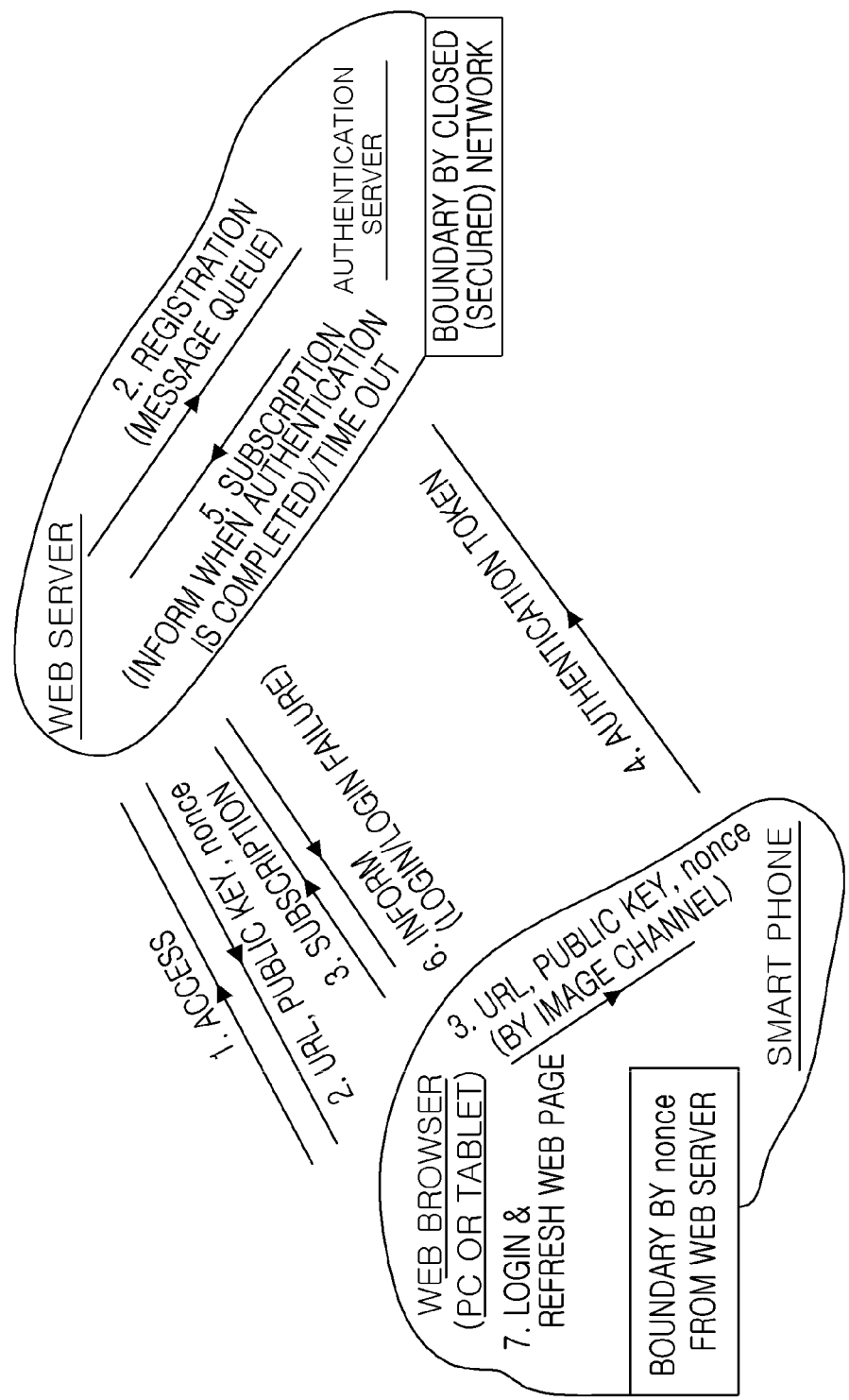

FIGS. 3 and 4 illustrate procedures of performing a login using the previously held account.

A login method will be described in detail below with reference to FIGS. 3 and 4.

First, when the user accesses the web service through the web browser to request a login, the web service shows the QR code through the web browser. The QR code includes the URL of the authentication server of the web service, the public key Wpub of the web service, and any bit string. The nonce is newly created whenever the user requests a login and a timer is operated as soon as the login request of the user is received. A web server of the web site previously sets time as a time limit showing the QR code in the timer. For example, when the user sets the timer to perform the authentication within 60 seconds, the QR code is shown only for 60 seconds and is automatically hidden after the elapse of 60 seconds. The reason for setting the timer is to prevent the nonce value from being reused. After the QR code is hidden, when the user wants the authentication, he/she needs to again request the authentication. In this case, the nonce value is renewed. The web server of the web site knows what user wants a login, and therefore is subscribed in an authentication server to let the authentication server inform when the authentication is completed (S201).

Next, the user photographs the QR code on a web browser screen using the authentication device. When the authentication device is a smart phone, the authentication device drives a separate application (hereinafter, app) for authentication and photographs the QR code. The authentication device confirms the URL included in the QR code to check whether the confidential is already present in the authentication device (S102, S103).

Next, if it is confirmed that the confidential is not stored, an error message is output (that is, authentication failure) (S214).

On the other hand, if it is confirmed that the confidential is stored, an authentication token is created and then transmitted to the URL included in the QR code. The authentication token includes the confidential (that is, the user ID and the public key Dpub of the key pair created by the user) and the nonce obtained from the QR code. Further, the authentication token includes the signature for the nonce and the signature uses the secret key Dpriv. When all the contents are encoded by using the public key Wpub of the web server, the encoded contents become the authentication token (S204).

Next, when receiving the authentication token, the authentication server of the web service decodes the received authentication token and then confirms the signature to check whether a message is normal and if it is confirmed that the message is normal, the authentication server sees the confidential to determine whether the normal user attempts a login and if it is confirmed that the user is the normal user, informs the web server of the web service that the normal authentication is made. As described above, the web server of the web service is subscribed in the authentication server to receive the message for a set time and the authentication server responds thereto and thus the web server may perform the login processing on the corresponding user (S205).

As described above, according to the exemplary embodiment of the present invention, the communication between the web server of the web service and the authentication server may use a message queue, but the present invention is not limited thereto and the communication between the web server of the web service and the authentication server may use any method within a range included in the gist of the present invention.

When the authentication server of the web service confirms the confidential, the size of the public key is much larger than that of the password at the time of confirming whether the public key agrees and therefore a cost increase is expected, but the authentication server calculates and stores hash values (digests) for the public key at the time of the account creation, and then uses the hash values at the time of confirming whether the public key agree to minimize the costs, such that it may be appreciated that the problem of cost increase may not occur.

As described above, according to the exemplary embodiments of the present invention, it is possible to perform the user authentication only by holding the camera on the web browser screen when the dedicated device is present and improve the user convenience by driving applications which may be authenticated and then performing only the photographing even in the case of using a smart phone. In the case of a handicapped person who is difficult to perform the input through the keyboard, convenience may be more increased.

According to the exemplary embodiments of the present invention, it is possible to effectively cope with the brute force attack or the premeditated attack by using an encryption key instead of using the password. The existing 8 to 12 digit password which is combined only by alphabet and figures requires the attack attempts a maximum of $62^8$ ($\approx 2^{47}$) to $62^{12}$ ($\approx 2^{71}$) times, but according to the exemplary embodiment of the present invention, the encryption key usually uses 512 bits, 1024 bits, and 2048 bits, and therefore at the time of the brute force attack search, the attack attempts are required a maximum of $2^{512}$, $2^{1024}$, and $2^{2048}$ times, such that the present invention may provide the high security strength.

According to the exemplary embodiments of the present invention, the secret key essential for authentication is not stored in the authentication server, and therefore even though the specific web service is hacked to expose all the contents of database included in the authentication server, it is possible to prevent the login from being made in the user name.

According to the exemplary embodiments of the present invention, different confidential for each web service is used, and therefore even though the specific web service is exposed to hacking, no account of other services is damaged, each web service uses different keys at all times and thus security may be secured, and the user does not require to memorize even his/her own ID and thus the user ID may be differently set for each web service, such that even though several web services maliciously gain agreement, it is difficult to find out a correlation between users.

According to the exemplary embodiments of the present invention, the user never directly inputs contents at the time of a login, and therefore the contents are safe from a keylogger (keyboard hacking).

According to the exemplary embodiments of the present invention, since all the security related information is stored in the smart phone of the user and the smart phone directly communicates with the web server, even when the stability of the used PC is not secured (for example, shared computer of a PC room, and the like), security may be secured.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for web service user authentication, comprising:
    creating, by a web server, a code including a public key of a web service and displaying the created code on a web browser screen;
    creating, by a user, a user ID and a key pair if it is confirmed that the user does not loin the web service using information received from the code including a public key of the web service, the key pair including a public key and a secret key;
    transmitting, by an authentication device, a message obtained by encoding the user ID, the public key of the key pair, a bit string, the public key of the web service, a signature for the bit string, and a signature for the public key of the web service using the public key of the web service to the web server;
    displaying, by the web server of the web service, the code including an authentication server uniform resource locator (URL) of the web service on the web browser screen;
    when the user photographs the code on the web browser screen using the authentication device, confirming, by the authentication device, the authentication server URL of the web service included in the code to confirm whether a user confidential is stored;
    if it is determined that the user confidential is stored, generating, by the authentication device, an authentication token including the confidential being encoded and transmitting the authentication token to the authentication server URL of the web service included in the code; and
    confirming, by an authentication server of the web service, a result obtained by decoding the received authentication token and if it is confirmed that the message is normal and a normal user attempts a login, notifying the web server of the web service that normal authentication is made.

2. The method of claim 1, wherein the code includes an authentication server URL of the web service, a public key of the web service, and any bit string.

3. The method of claim 2, wherein the any bit string is newly created whenever the user requests a login and a timer is operated as soon as the user requests the login.

4. The method of claim 1, wherein in the confirming whether the confidential is stored, if it is confirmed that the confidential is not stored, the authentication device outputs an error message.

5. The method of claim 1, wherein the authentication token is encoded using the confidential, any bit string obtained from the code, and a signature for the any bit string using a public key, and
    the confidential includes a user ID and a public key of a key pair which are created when the user creates an account to join the web service.

6. The method of claim 1, wherein in the informing of the web server of the web service that normal authentication is made,
    the authentication server of the web service decodes the authentication token and then confirms a signature to check whether a message is normal and if it is confirmed that the message is normal, the authentication server checks the confidential to determine whether a normal user attempts a login and if it is confirmed that a normal user attempts a login, notifies the web server of the web service that the normal authentication is made.

7. The method of claim 1, further comprising:
prior to the displaying of the code including the authentication server URL of the web service on the web browser screen by the web server of the web service,
providing, by the web server, a joining form to a user;
transmitting, by the web server, the bit string for confirming the authentication device to an authentication device of a user when the user prepares a form;
resolving, by the web server, the message received from the authentication device using his/her own secret key and confirming whether the signature is correct; and
storing, by the web server, contents of a form input by the user and a public key of the user obtained by decoding in a database included in the web server.

8. The method of claim 7, wherein a two-dimensional barcode includes an URL of the web service, the public key of the web service, and any new bit string separate from the bit string.

9. The method of claim 1, wherein the code is a two-dimensional code.

* * * * *